US009038502B2

(12) United States Patent
Zoumaras et al.

(10) Patent No.: US 9,038,502 B2
(45) Date of Patent: May 26, 2015

(54) CONTROL INTERFACE ACTIVATED RESTRAINING SYSTEM TO SECURE A RIDER'S FOOTWEAR TO A FOOT SUPPORT

(75) Inventors: Steven Zoumaras, San Diego, CA (US);
John Emerson, El Cajon, CA (US);
Gustaf Belt, Santa Rosa, CA (US);
Daniel S. Kline, Encinitas, CA (US);
Adam Livingston, Vista, CA (US);
David Tyvoll, La Jolla, CA (US)

(73) Assignee: Evolution Racing Products, LLC, San Diego, CA (US)

( * ) Notice: Subject to any disclaimer, the term of this patent is extended or adjusted under 35 U.S.C. 154(b) by 630 days.

(21) Appl. No.: 13/048,722

(22) Filed: Mar. 15, 2011

(65) Prior Publication Data

US 2011/0219911 A1  Sep. 15, 2011

Related U.S. Application Data

(60) Provisional application No. 61/314,103, filed on Mar. 15, 2010.

(51) Int. Cl.
*B62M 3/00* (2006.01)
*B62J 25/00* (2006.01)
*B62M 3/08* (2006.01)

(52) U.S. Cl.
CPC . *B62J 25/00* (2013.01); *B62M 3/08* (2013.01); *B62M 3/083* (2013.01); *B62M 3/086* (2013.01)

(58) Field of Classification Search
USPC .................................. 74/564, 594.6; 296/75
See application file for complete search history.

(56) References Cited

U.S. PATENT DOCUMENTS

| | | | |
|---|---|---|---|
| 4,458,910 A | 7/1984 | Stillwagon | |
| 4,640,151 A | 2/1987 | Howell | |
| 4,665,767 A | 5/1987 | Lassche | |
| 4,809,563 A | 3/1989 | Loppnow | |
| 4,932,287 A | 6/1990 | Ramos | |
| 4,969,375 A | 11/1990 | v.d.Osten-Sacken et al. | |
| 5,060,537 A | 10/1991 | Nagano | |
| 5,097,687 A * | 3/1992 | Turrin et al. ................. | 74/594.6 |
| 5,259,270 A | 11/1993 | Lin | |
| 5,575,184 A | 11/1996 | De Schrijver | |
| 6,477,917 B1 | 11/2002 | Peyre et al. | |
| 6,543,310 B1 | 4/2003 | Baker et al. | |
| 6,783,139 B1 | 8/2004 | Wang et al. | |
| 6,957,821 B2 | 10/2005 | Gorman et al. | |
| 7,021,175 B1 | 4/2006 | Xie | |
| 7,073,409 B2 | 7/2006 | Ho | |

(Continued)

FOREIGN PATENT DOCUMENTS

| | | |
|---|---|---|
| CA | 2485324 A1 | 5/2006 |
| EP | 0953502 A1 | 11/1999 |
| JP | 2008221880 | 9/2008 |

*Primary Examiner* — Vicky Johnson
(74) *Attorney, Agent, or Firm* — Jonathan L. Petit; Duckor Spradling Metzger & Wynne

(57) ABSTRACT

A restraining system is configured to secure and release a rider's footwear to a vehicle footrest in response to inputs to a control interface. The vehicle is typically a motorcycle or bicycle. In the case of a motorcycle, a rider's boot is restrained to a motorcycle foot peg by the action of a restraining device. Exemplary restraining device embodiments include an electromagnet or a mechanical latch. The control interface may be located on the motorcycle handlebar or on the rider's helmet. The rider can provide the inputs directly to the control interface. Alternatively, the inputs may be received from a wireless source.

11 Claims, 17 Drawing Sheets

(56) References Cited

U.S. PATENT DOCUMENTS

| | | |
|---|---|---|
| 7,178,272 B2 | 2/2007 | Xie |
| 7,571,544 B2 * | 8/2009 | Champoux et al. ............ 33/1 N |
| 7,581,338 B1 | 9/2009 | Housley, Jr. et al. |
| 7,644,521 B2 | 1/2010 | McCarron |
| 7,757,583 B1 * | 7/2010 | Reading ......................... 74/564 |
| 2004/0035624 A1 | 2/2004 | Fecteau et al. |
| 2006/0248965 A1 * | 11/2006 | Wyatt et al. .............. 73/862.391 |
| 2008/0040937 A1 * | 2/2008 | Champoux et al. ............ 33/1 N |
| 2008/0179589 A1 | 7/2008 | Svensson |
| 2008/0179859 A1 | 7/2008 | Boehmke et al. |
| 2009/0229146 A1 | 9/2009 | Yanke et al. |
| 2009/0250282 A1 | 10/2009 | Davis et al. |
| 2010/0018450 A1 * | 1/2010 | Matsueda et al. ............. 114/363 |
| 2010/0062740 A1 | 3/2010 | Ellis et al. |
| 2011/0005103 A1 * | 1/2011 | Krouse .......................... 36/134 |

* cited by examiner

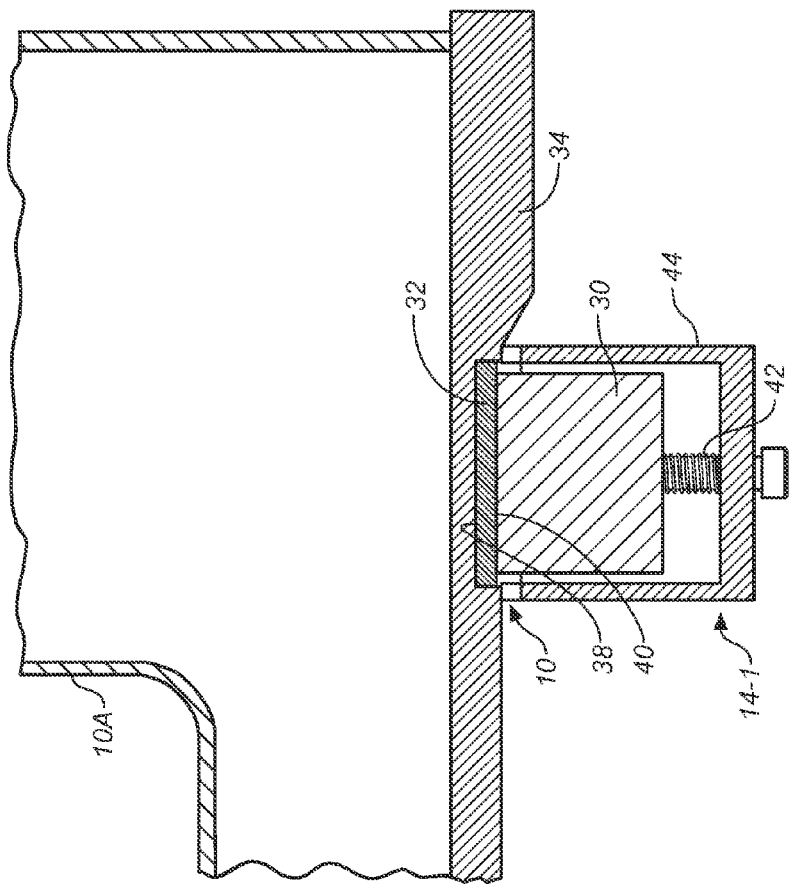
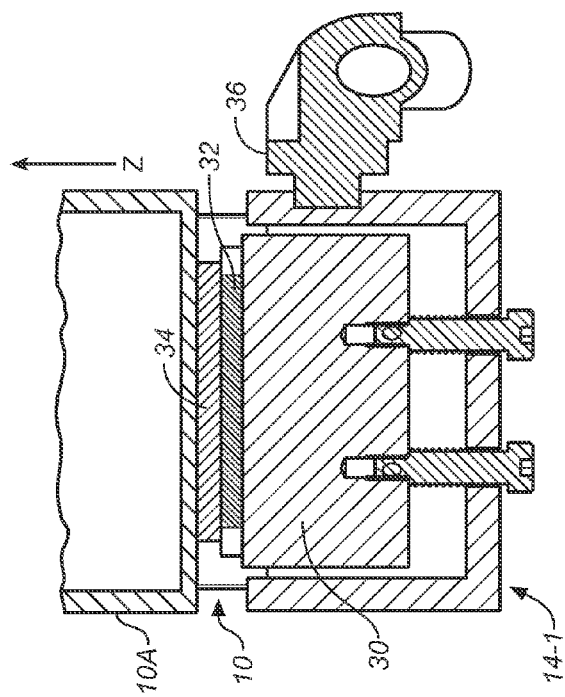
FIG. 5G
FIG. 5F

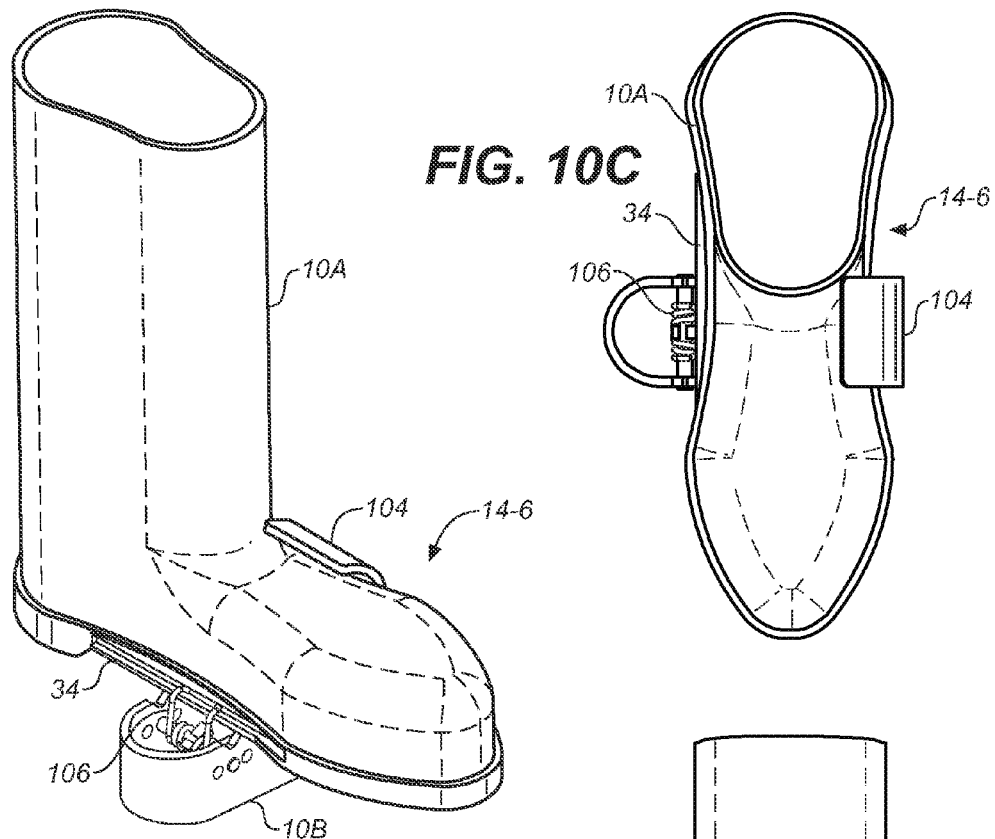
FIG. 10C
FIG. 10A
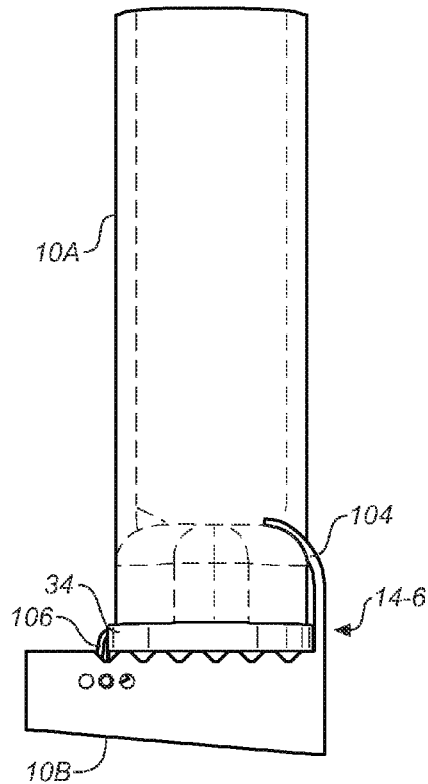
FIG. 10B

CONTROL INTERFACE ACTIVATED RESTRAINING SYSTEM TO SECURE A RIDER'S FOOTWEAR TO A FOOT SUPPORT

RELATED APPLICATIONS

This non-provisional patent application claims priority to U.S. Provisional Application Ser. No. 61/314,103, entitled "Control Interface Activated Restraining System to Secure a Boot to a Foot Peg", filed on Mar. 15, 2010, incorporated herein by reference under the benefit of U.S.C. 119(e).

FIELD OF THE INVENTION

The present invention concerns an improvement in a restraint of a rider to a vehicle such as a motorcycle or bicycle. More particularly, the present invention includes a control interface-activated restraining system to restrain a rider's footwear relative to a foot support of the vehicle while riding over challenging terrain or jumps.

BACKGROUND

A vehicle such as a motorcycle or bicycle includes a seat on which a rider is seated and at least one pair of foot supports located at a lower portion of the vehicle relative to the seat. The foot supports may be the foot pegs of a motorcycle or the pedals of a bicycle.

A motorcycle typically has foot-operated controls in close proximity to the foot pegs such as a brake and a gearshift. While in forward motion and in normal riding, the rider's feet typically rest upon the foot pegs. This is typically quite acceptable for riding on paved and/or smooth roads.

However, if the rider encounters very rough terrain or jumps, the shaking may cause the rider's feet to lose contact with the foot peg. The loss of contact may be very dangerous. Experienced riders compensate for this by gripping the sides of the seat with their knees and/or thighs and hanging on to the handlebars. An example of such an experienced rider is a Motocross competitor who routinely rides over very rough terrain and jumps.

Yet riding this way does not maintain an ideal amount of control for a Motocross competition. One solution proposed is described in patent application 2008/0179859 by Boehmke et al. filed on Jan. 27, 2007. Boehmke describes a mechanism for clipping the rider's boot to the foot peg. While offering some improvement, issues remain such as the inconvenience of having to manually eject the boot from the restraint and the potential for crashes with the boot still clipped. What is needed is a new solution that is more convenient to the rider and can be quickly engaged and disengaged.

BRIEF DESCRIPTION OF THE DRAWINGS

FIG. 5F is detailed portion 5F-5F taken from FIG. 5C.

FIG. 5G is detailed portion 5G-5G taken from FIG. 5E.

FIG. 10A is an isometric view of restraining device embodiment 14-6.

FIG. 10B is a frontal view of a sixth embodiment of interface 10 with boot 10A restrained to peg 10B.

FIG. 10C is a top view of a sixth embodiment of interface 10 with boot 10A restrained by restraining device 14-6.

DETAILED DESCRIPTION OF THE PREFERRED EMBODIMENTS

While the present invention will be primarily described in terms of its application to a motorcycle, it is to be understood that it is also applicable to a bicycle. The aforementioned needs of a motorcycle are similarly applicable to bicycles, particularly to those referred to as "mountain bikes" that tend to be ridden over rough terrain.

Figure 1:
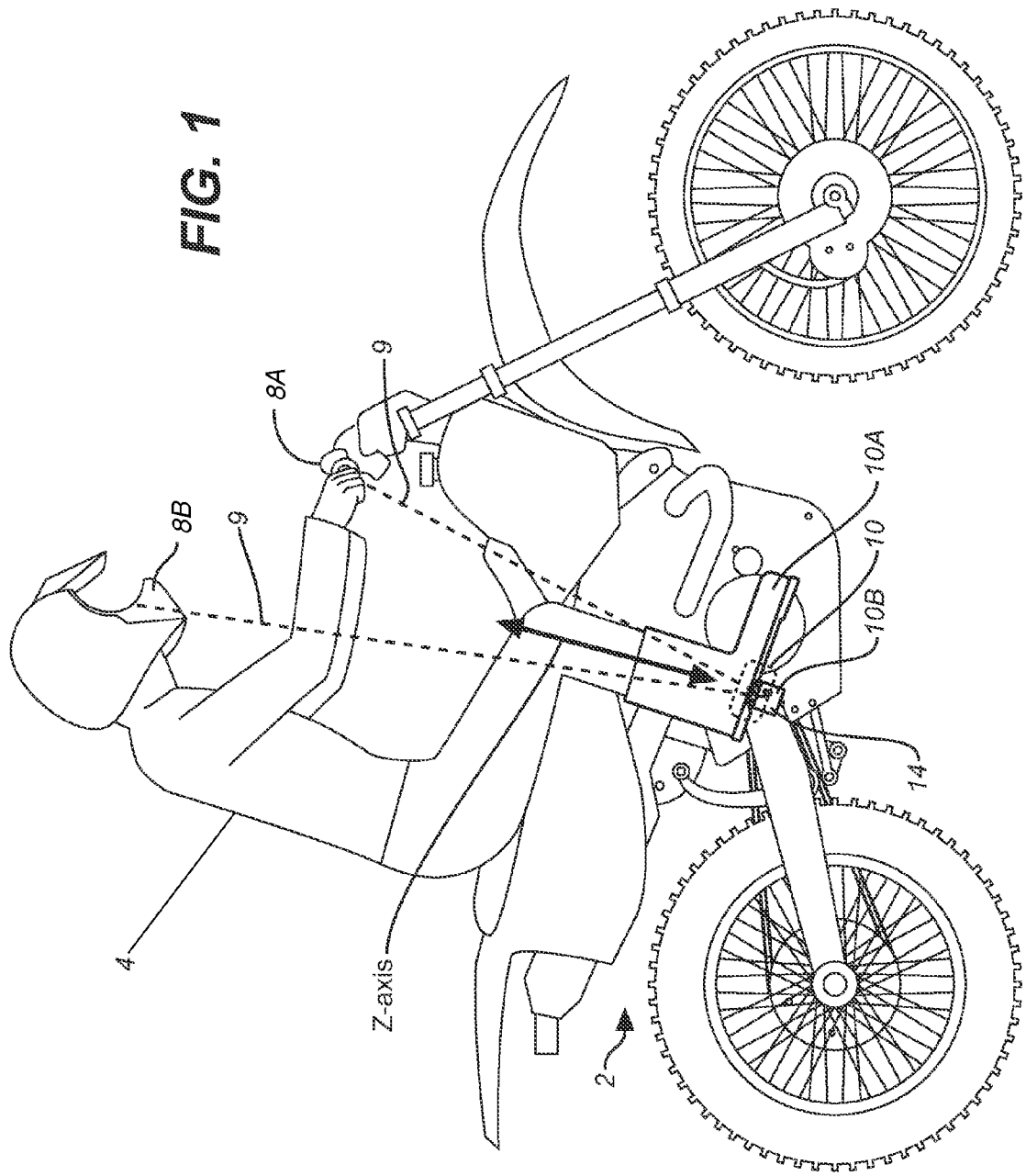
FIG. 1 depicts a rider 4 on a motorcycle 2 utilizing a restraining system 6 of the present invention.

A motorcycle 2 and rider 4 utilizing an exemplary embodiment of the restraining system 6 (FIG. 2) of the present invention is depicted in illustrative form in FIG. 1. Restraining system 6 includes control interface 8 operatively coupled to peg and boot interface 10. Control interface 8 is separated from interface 10 meaning that it may be remote or spaced at some distance and/or be a physically separate part from interface 10.

In one embodiment, control interface 8 is coupled to a handlebar of motorcycle 2 and may include a finger-actuated switch. In a second embodiment control interface device 8 is located in a helmet and may be sound activated (e.g., via a microphone). In a third embodiment, control interface 8 has portions in a plurality of locations such as both the handlebar and the helmet. Other locations and embodiments of control interface 8 are possible such as in boot 10A.

Control interface device 8 is configured to receive an input from rider 4. In one embodiment the input is the finger-actuated closing and/or opening of a switch. In another embodiment, the input is a voice received by a microphone. In other embodiments, the input may be received in any one of a plurality of different ways, such as a finger input, a pressing of a button, a twisting of a dial, a twisting of a wrist, and a foot actuation to name a few examples.

In another embodiment the control interface 8 is configured to receive a wireless signal that is remote from motorcycle 2. In one embodiment the wireless signal is a GPS locator signal that may be indicative of a location along a race course. From here forward, the control interface 8 will be described as receiving first and second inputs from rider 4 but it is to be understood that control interface 8 may also receive the first and second inputs from an external source of wireless signals.

The peg/boot interface 10 is configured to restrain boot 10A to peg 10B in response to a first input from rider 4 to control interface 8. The peg/boot interface is configured to release boot 10A from peg 10B in response to a second input from rider 4 to control interface 8.

Hereafter, the invention will be described wherein interface 10 includes a restraining device 14 that is configured to couple to a restraining feature 18 in response to the first input to control interface 8. In an exemplary embodiment restraining device 14 is primarily configured to restrain translational (but not necessarily rotational) motion of boot 10A relative to peg 10B along a z-axis that is generally aligned with a long axis of lower leg of rider 4. Restraining device 14 may allow other motion of boot 10A relative to peg 10B such as rotation along other axes such as an x-axis that is parallel to the long axis of peg 10B (coming out the page in FIG. 1). Having the boot restrained along the z-axis yet otherwise less constrained may allow for braking and shifting using boot 10A while the restraining device 14 is coupled to the restraining feature 18. This may also allow for some boot motion, which would allow rider 4 to manually escape from interface 10 by rotating boot 10A relative to peg 10B. In other embodiments boot 10A may be restrained along other axes such as a gravitational axis.

Restraining device 14 is mounted proximate to foot peg 10B meaning that it is mounted upon or in close proximity to foot peg 10B. In the case of a bicycle, restraining device 14 is mounted upon a bicycle pedal 10B.

Figure 2:
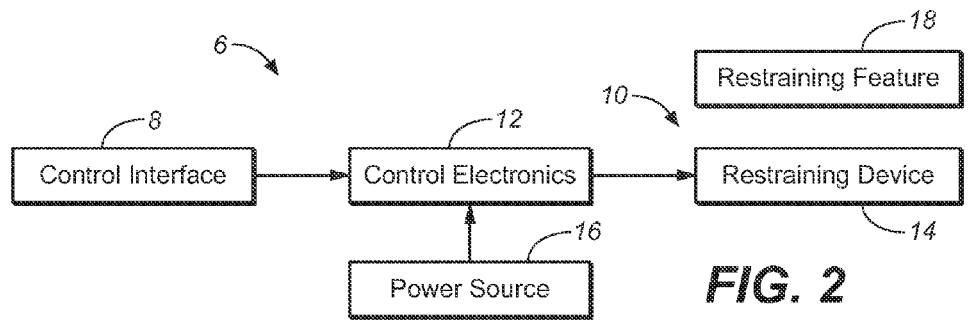
FIG. 2 is a block diagram of a preferred embodiment of a restraining system 6 of the present invention.

A block diagram of an exemplary embodiment of restraining system 6 is depicted in FIG. 2. Restraining system 6 includes control electronics 12 coupled to control interface 8 and restraining device 14 and receives power from power source 16. In one embodiment, control interface 8 transmits a signal to control electronics 12 wirelessly. In another embodiment, control interface 8 is coupled to control electronics 12 by a signal wire.

Control electronics 12 are configured to operate and change a state of restraining device 14 in response to receiving inputs from control interface 8. In response to receiving a first input from control interface 8, control electronics 12 are configured to activate restraining device 14 whereby restraining device 14 mechanically couples to complementary boot restraining feature 18. Boot restraining feature 18 is referred to as complementary relative to restraining device 14 because they form an effective interface 10 whereby restraining feature 18 is secured to restraining device 14 in response to the first input.

In one embodiment, the control interface 8 is configured to control restraint for both the left and right boots simultaneously. In a second embodiment, the control interface 8 is configured to control restraint for the left and right boots independently. In a preferred embodiment, the restraining feature 14 is the same for both left and right boots. In an alternative embodiment, different restraining features 14 are used for the left and right boots. In a preferred embodiment the control electronics 12 are coupled to a sensor or feedback device that is incorporated into restraining device 14 to indicate whether or not each boot has been properly restrained.

Figure 3A:
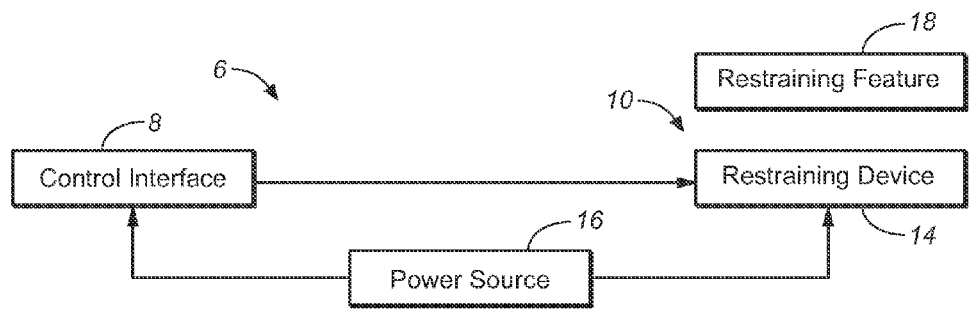
FIG. 3A is a block diagram of a first alternative embodiment of the restraining system 6 of the present invention.

A first alternative embodiment of restraining system 6 is depicted in block diagram form in FIG. 3A. In this design, control interface 8 is a switch that opens and closes a circuit formed between power source 16 and restraining device 14. When switch 8 is closed, power is coupled to restraining device 14 that then secures restraining feature 18 to restraining device 14. When switch 8 is open, restraining device 14 is in a released state whereby restraining feature 18 is not secured to restraining device 14.

Figure 3B:
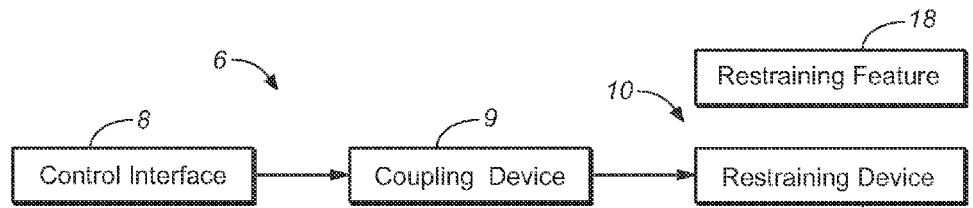
FIG. 3B is a block diagram of a second alternative embodiment of the restraining system 6 of the present invention.

A second alternative embodiment of restraining system 6 is depicted in block diagram form in FIG. 3B. In this design, control interface 8 is coupled to restraining device 14 via a coupling device 9 (depicted as a dashed line in FIG. 1) when restraining device 14 is remote or spaced from control interface 8. In one embodiment coupling device 9 is mechanical in nature and may include a cable, a lever, a gear train, or a combination thereof that provides mechanical coupling between control interface 8 and restraining device 14. In another embodiment coupling device 9 is pneumatic in design and includes one or more air pressure lines that couple control interface 8 to restraining device 14. In yet another embodiment coupling device 9 includes one or more conductive wires that couple control interface 8 to restraining device 14.

In still another embodiment coupling device 9 includes a wireless link that couples control interface 8 to restraining device 14.

Restraining device 14 is spaced from or remote from control interface 8 in that they are not integrated into the same component. In a preferred embodiment restraining device 14 is integral to peg 10B while control interface 8 is physically separate from peg 10B. Physically separated, spaced or remote in the context of this invention may be a small separation or it may indicate nearly opposite end portions of the motorcycle, or a location remote from the motorcycle.

Yet another alternative embodiment relative to FIG. 2 utilizes an air logic circuit rather than an electrical circuit for controlling a pneumatic restraining device 14. The air logic circuit is responsive to inputs to control interface 8 and may use air pressure rather than electrical power to operate restraining device 14. Power source 16 can optionally be an air pressure source 16 that provides logical responses to inputs from control interface 16 and provides pneumatic power to restraining device 14. As a note any combination of electrical power and pneumatic response is anticipated. For example, control interface 8 may provide an electrical signal that is utilized by restraining device 14, which in turn fixates the restraining feature 18 pneumatically.

In yet another alternative embodiment relative to FIG. 2 restraining device 14 is located on boot 10A and restraining feature 18 is located on peg 10B. In this alternative embodiment boot 10A may include the control electronics 12 and the power source 16 depicted in FIG. 2. In the paragraphs that follow, it is anticipated that various alternatives for the location of restraining device 14 and restraining feature 18 are anticipated.

Figure 4:
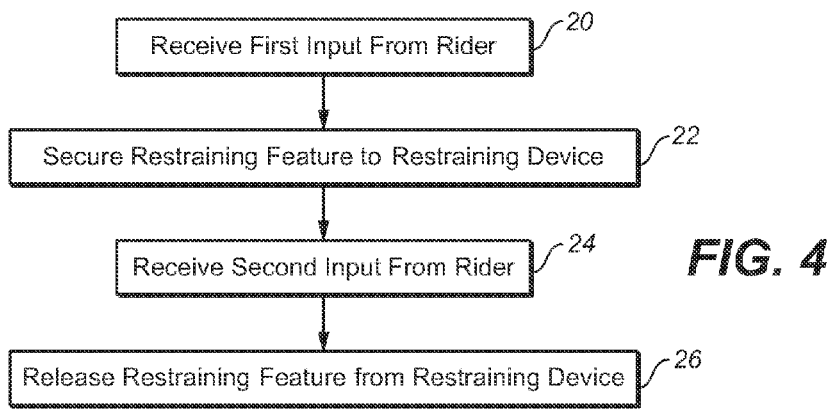
FIG. 4 is an exemplary method of use of the present invention in flow chart form.

An exemplary method of the present invention is depicted in flow chart form in FIG. 4. According to step 20, the control interface 8 receives a first input from rider 4. The input may be in the form of a button 8A being pushed or it may be in the form of a voice input to a microphone 8B. Alternatively an input may include other actions by rider 4 such as the moving of a lever or dial. Also according to 20, the first input is transmitted from control interface 8 to control electronics 12 wirelessly, by a wired connection, pneumatically, or by a mechanical connection.

In response to the first input, the control electronics 12 or a coupling device 9 activates the restraining device 14 to secure the restraining feature 18 to the restraining device 14 according to step 22. Between steps 22 and 24, the rider may be passing over a jump and/or rough terrain on motorcycle 2 after which the rider may want to release boot 10A from peg 10B.

According to 24, the control interface 8 receives a second input from rider 4. According to 26, the restraining device 14 releases the restraining feature 18 in response to the second input. In an alternative embodiment the first and second inputs may be wireless inputs received by control interface 8.

In the paragraphs that follow, various different embodiments of restraining system 6 including a restraining device 14 and restraining feature 18 will be discussed with figures focusing in on the interface 10. The various embodiments of restraining device 14 will be referred to as 14-1 for the first embodiment, 14-2 for the second embodiment, and so on.

Figure 5A:
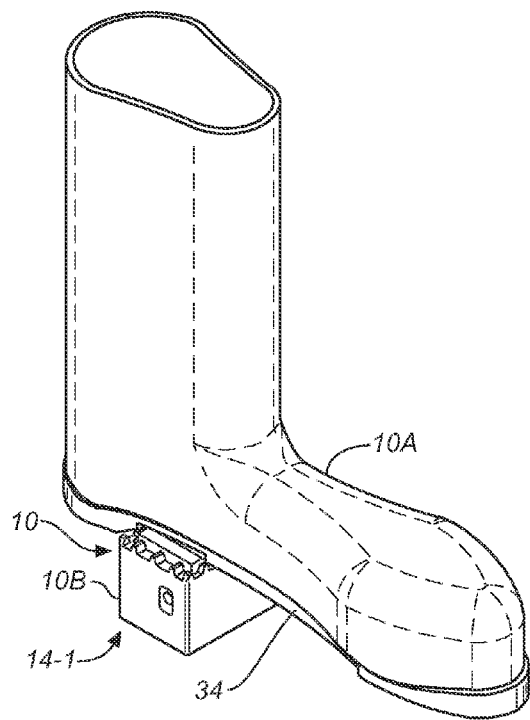
FIG. 5A is an isometric view of a boot 10A and peg 10B interface incorporating a first embodiment 14-1 of a restraining device 14 of the present invention.
Figure 5B:
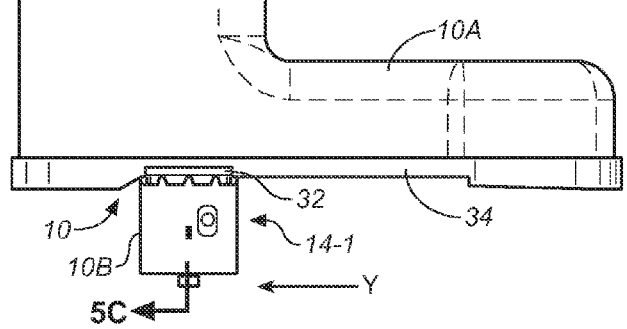
FIG. 5B is a side view of a boot 10A and peg 10B interface incorporating restraining device embodiment 14-1.
Figure 5E:
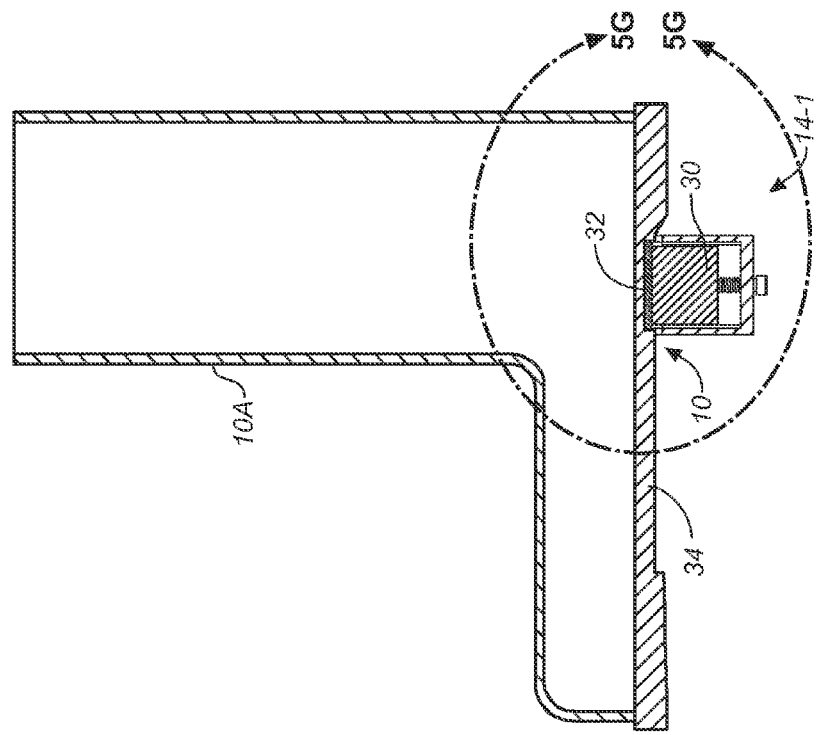
FIG. 5E is a cross sectional view taken through section 5E-5E of FIG. 5D.
Figure 5D:
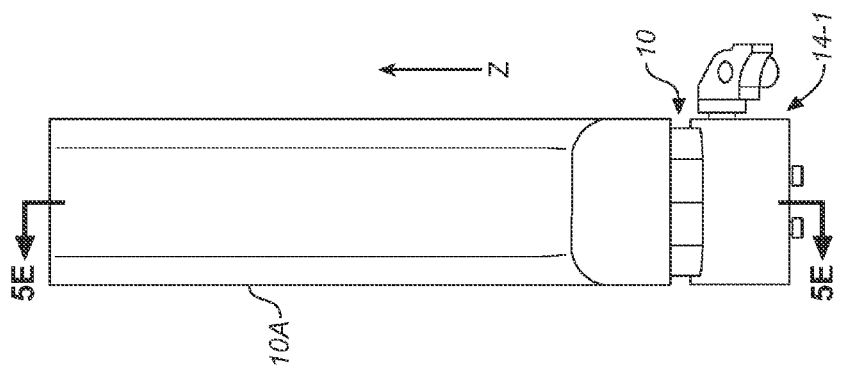
FIG. 5D is an end view of a boot 10A and peg 10B interface incorporating a restraining device embodiment 14-1.
Figure 5C:
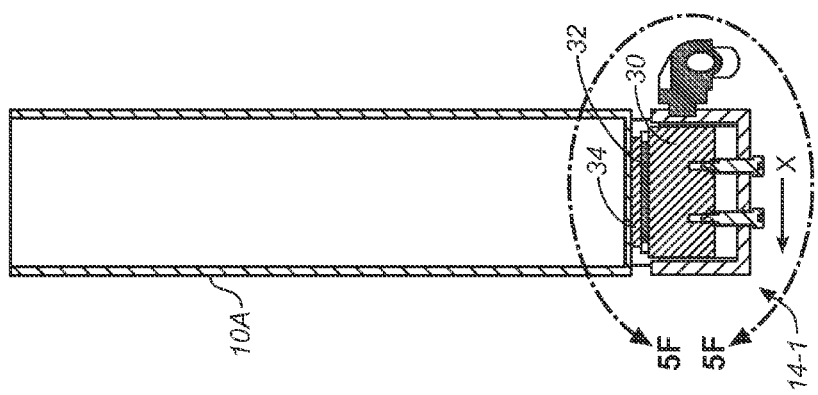
FIG. 5C is a cross sectional view taken through section 5C-5C of FIG. 5B.

A first embodiment of interface 10 is depicted in FIGS. 5A-G wherein restraining device 14-1 includes an electromagnet 30 (see FIG. 5C). FIG. 5A is an isometric view of boot 10A secured to peg 10B containing electromagnet 30. FIG. 5B is a side view and FIG. 5C is a cross section taken through section lines 5C-5C of FIG. 5B.

Boot 10A includes a magnetic plate or magnet 32 integrated into sole 34. The magnet or magnetic plate 32 may include one or more of a number of materials that may be metallic, non-metallic, polymeric, hard plastic, ceramic, or any combination thereof. The plate 32 is located proximate to a location of peg 10B when rider 4 positions boot 10A on peg 10B. Peg 10B includes electromagnet 30 (see FIG. 5C) that is configured to attract plate 32 when activated (when it receives current).

One advantage of this design is automatic self-centering. When electromagnet 30 is activated, an attractive force is generated between electromagnet 30 and plate 32. The force is maximized when the plate 32 completely overlaps the electromagnet 30. If such overlap does not occur, there tends to be a force directed along the x and y axes (see FIGS. 5B and 5C) that will tend to urge the plate into optimal alignment. Thus, the rider who is preoccupied with riding does not need to be concerned about finding the optimal location for boot 10A relative to peg 10B.

FIG. 5D is an end view of boot/peg interface 10 and FIG. 5E is a cross section taken through section 5E-5E of FIG. 5D. FIG. 5F depicts a detailed cross section view of interface 10 taken through portion 5F-5F of FIG. 5C. FIG. 5G depicts a detailed cross section view of interface 10 taken through portion 5G-5G of FIG. 5E.

FIGS. 5F and 5G in particular illustrate some additional aspects of the electromagnet embodiment 30 of restraining device 14-1. According to FIG. 5F, peg 10B has a rotational mount 36 relative to the motorcycle, allowing the electromagnet 30 to rotate relative to plate 32. This advantageously assures that a planar surface 38 of electromagnet 30 will have a close alignment to a planar surface 40 (see FIG. 5G) of metal plate 32 along an axis x of the rotational mount 36 and to avoid having out of plane effects that reduce the holding force of electromagnet 30 to plate 32. Also illustrated is a spring load mount 42 of electromagnet 30 relative to a housing 44 that biases the electromagnet 30 upwardly to assure a close proximity between electromagnet 30 and plate 32.

In operation, a first input is received by control interface 8 from rider 4. In response, a first signal is sent to control electronics 12 that activate (provide current to) electromagnet 30, self-aligning and securing metal plate 32 to electromagnet 30. Later, control interface 8 receives a second input from rider 4. In response, a second signal is sent to control electronics 12 that respond by shutting down the current to electromagnet 30, thereby releasing plate 32 from electromagnet 30. An additional advantage of restraining device 14-1 is that it is essentially not noticeable by rider 4 when it is not activated.

A second exemplary embodiment interface 10 is now discussed, whereby restraining feature 18 includes an opening formed into the bottom of a boot sole configured to receive an extendable portion from restraining device 14-2. The opening preferably has a reentrant geometry, which enables locking between the extendable portion and the opening. An example of a reentrant geometry is a hole or channel with a lip proximate to an exit to the hole. The extendable portion preferably has a widened top portion, which interferes with and is caught by the lip in a locking configuration. To unlock this configuration, the extendable portion is turned, collapsed, and/or translated to eliminate the interference between the top and the lip. The hole or opening can be of any geometry such as circular, square, rectangular, etc.

Figure 6A:
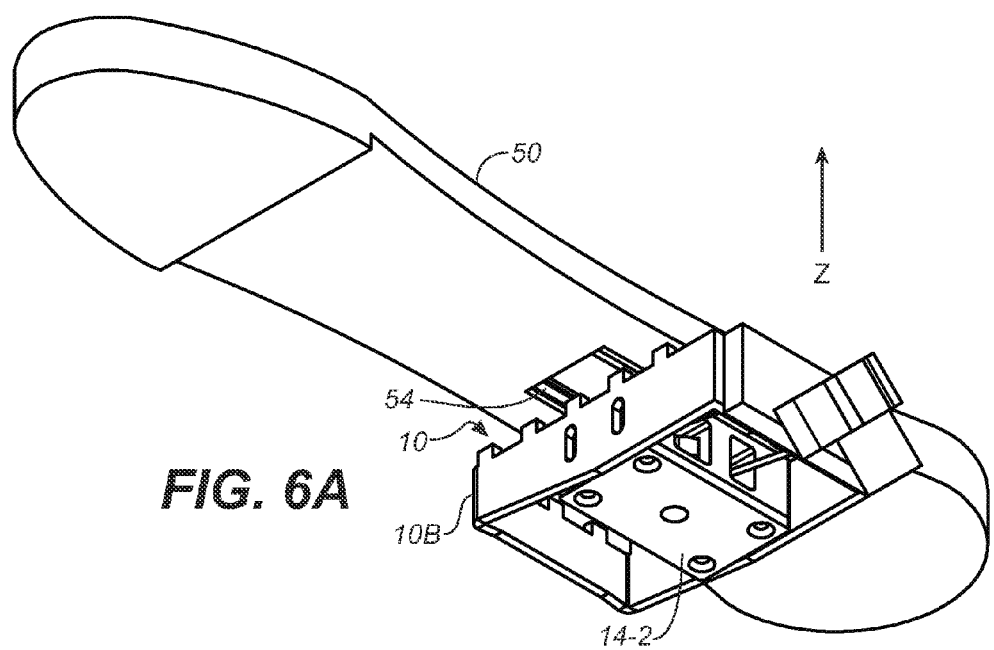
FIG. 6A is an isometric view of an interface 10 incorporating restraining device embodiment 14-2.
Figure 6B:
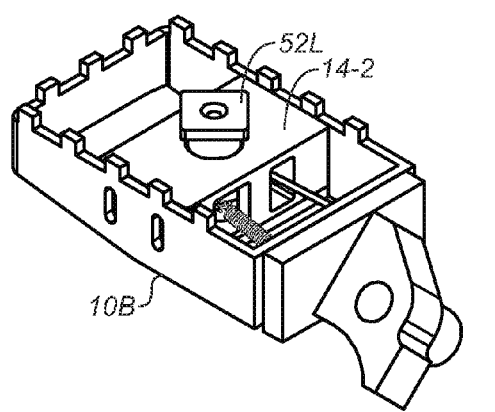
FIG. 6B is an isometric view of restraining device embodiment 14-2 in a locked state.
Figure 6C:
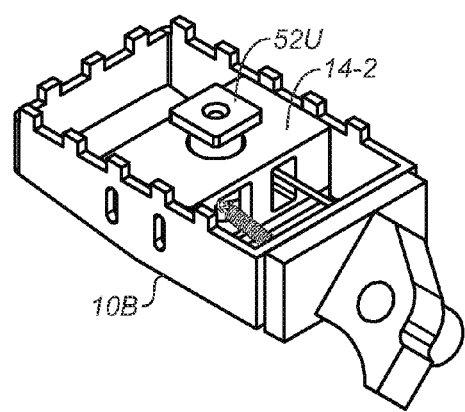
FIG. 6C is an isometric view of restraining device embodiment 14-2 in an unlocked state.

A particular example of this second exemplary embodiment interface 10 utilizing a locking pin is depicted with respect to FIGS. 6A-F. FIG. 6A is an isometric view of a boot sole 50 and a peg 10B that incorporates restraining device 14-2 utilizing a locking pin 52 (see FIGS. 6B, 6C). FIG. 6B depicts the restraining device 14-2 in a locked state (with locked pin 52L) and FIG. 6C depicts the restraining device 14-2 in an unlocked state (with unlocked pin 52U). In the unlocked state, pin 52U has it sides parallel with and fitting between sides of channel 54 so that pin 52 can be readily inserted and removed from channel 54. In the locked state the corners of pin 52L overlap the sides of channel 54 thereby restraining pin 52 from being pulled out of channel 54.

Figure 6D:
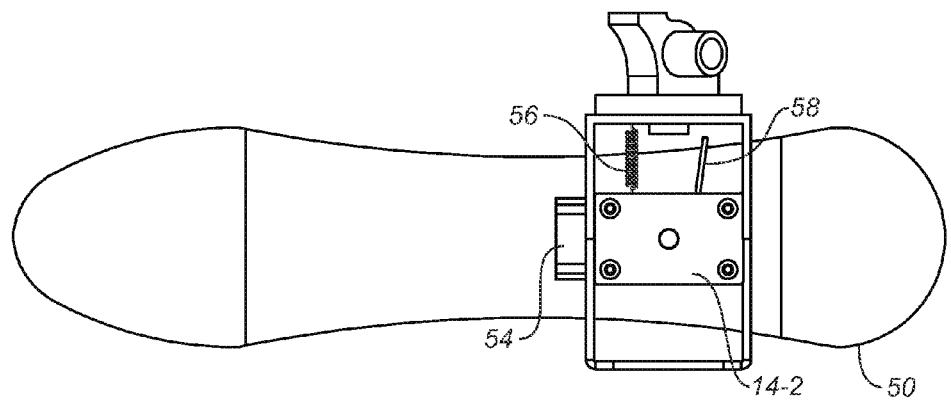
FIG. 6D is a bottom view of an interface 10 incorporating restraining device embodiment 14-2.

FIG. 6D is a bottom view of interface 10 depicting a mechanism for locking and unlocking pin 52 including a spring 56 and a cable 58. Spring 56 exerts a torque on a shaft of pin 52 that urges pin 52L toward the locked state. Actuation cable 58 is configured to exert an opposing torque on the shaft of pin 52 that rotates pin 52U to the unlocked state.

Figure 6E:
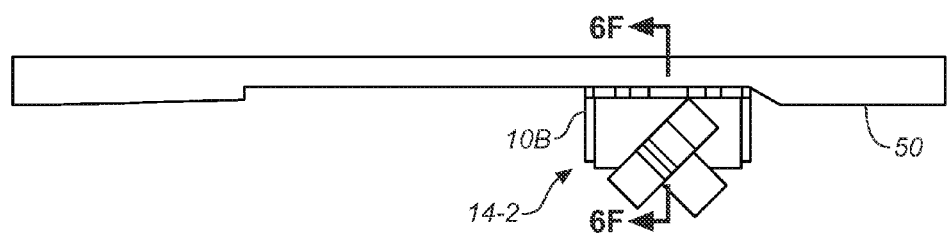
FIG. 6E is a side view of an interface 10 incorporating restraining device embodiment 14-2.
Figure 6F:
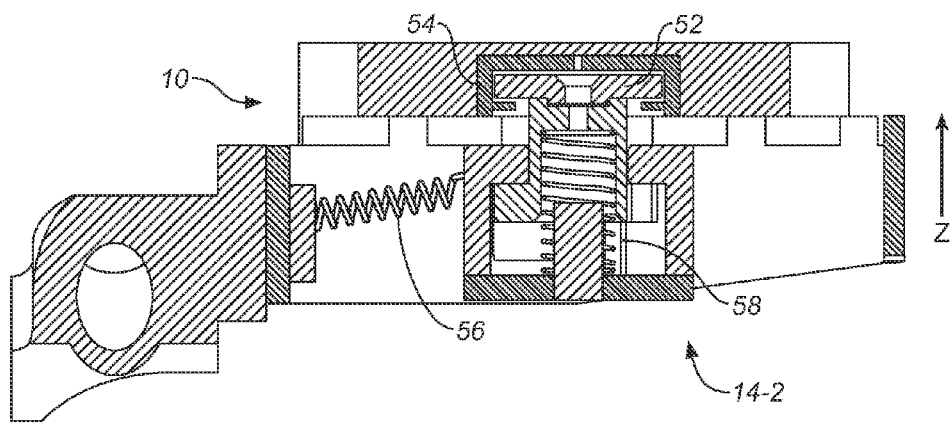
FIG. 6F is a detailed cross sectional view taken from section 6F-6F of FIG. 6E.

FIG. 6E depicts a side view of the boot sole 50 and peg 10B. FIG. 6F depicts a detailed cross sectional view taken through 6F-6F of FIG. 6E. In FIG. 6F, pin 52L is shown in a locked state in channel 54. Pin spring 56 maintains pin 52 in the locked state. Interface 10 also includes a spring 58 configured to bias the pin 52 into an up position so that it will engage the channel 54 when the rider positions channel 54 on peg 10B.

In operation, pin 52 is initially in the locked state but is outside of the boot channel 54, which is resting upon pin 52. In response to a first input received by control interface 8 from rider 4, pin 52 is momentarily rotated from a locked to an unlocked state, aligning pin 52 with channel 54. Once pin 52 is aligned with channel 54, spring 58 can then displace pin 52 up into channel 54. At that point, pin 52 rotates back to the locked state in response to the force of spring 56. In response to a second input received by control interface 8 from rider 4, the pin again rotates to an unlocked state to allow rider 4 to lift boot 10A away from being restrained.

A third exemplary embodiment of interface 10 is now discussed, whereby the restraining feature is an upstanding member or a latch feature positioned on the sole of the boot 10A. The restraining device 14-3 includes a latching device configured to latch to the upstanding member in response to the first input received by control device 8.

Figure 7A:
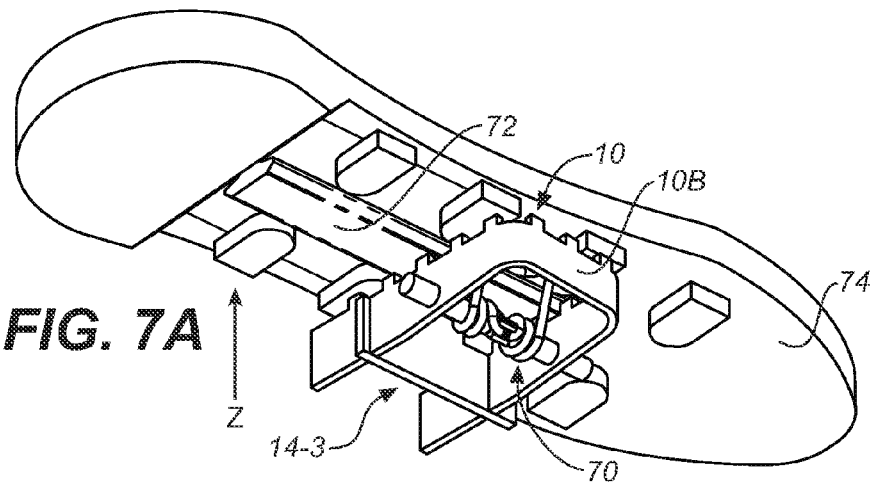
FIG. 7A is an isometric view of an interface 10 incorporating restraining device embodiment 14-3.

FIGS. 7A-E depict a particular example of this third exemplary embodiment of interface 10 including a latch assembly 70 configured to fixedly couple to a boot rail 72. FIG. 7A is an isometric view looking up at boot sole 74 resting upon peg 10B. Within peg 10B is latch assembly 70 that is coupled to boot rail 72.

Figure 7B:
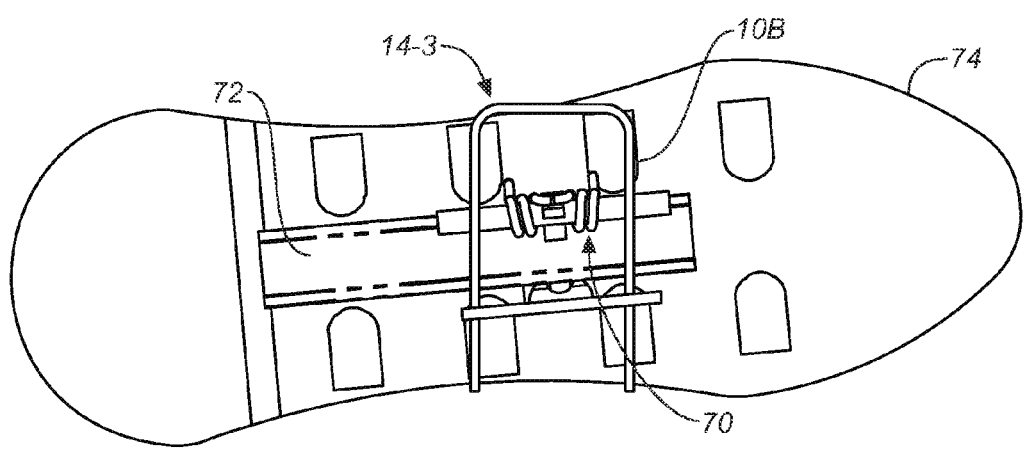
FIG. 7B is a bottom view of an interface 10 incorporating restraining device embodiment 14-3.
Figure 7C:
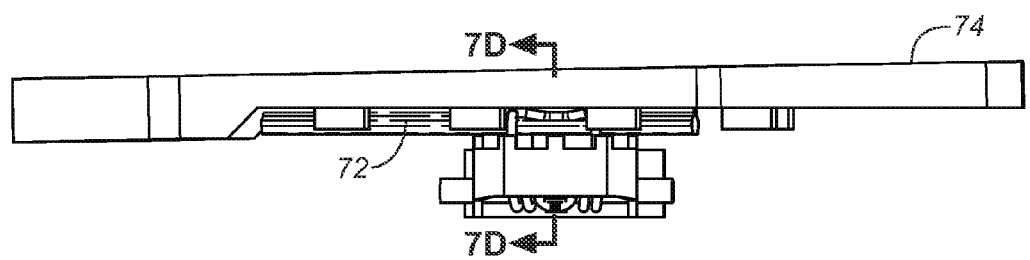
FIG. 7C is a side view of an interface 10 incorporating restraining device embodiment 14-3.
Figure 7D:
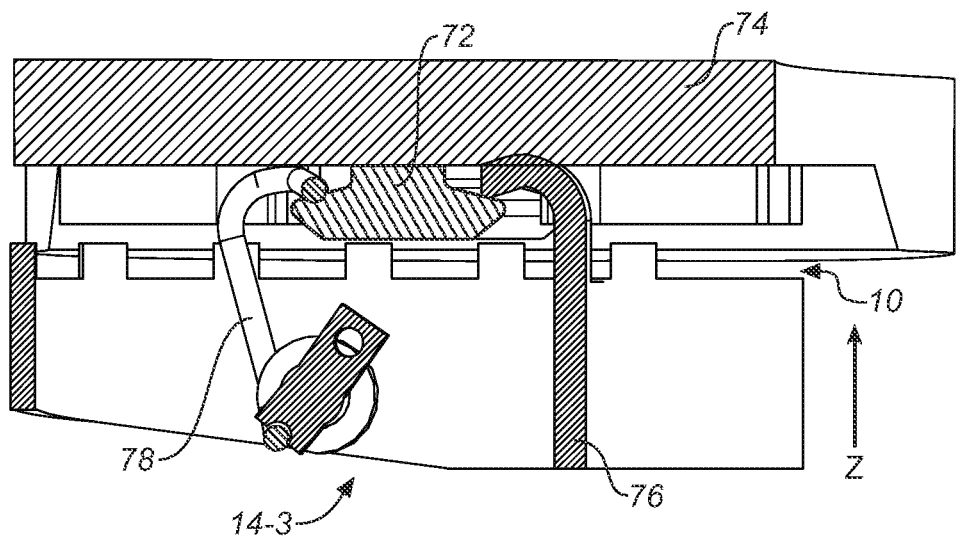
FIG. 7D is a detailed cross sectional view of an interface 10 in a latched state taken from section 7D-7D of FIG. 7C.
Figure 7E:
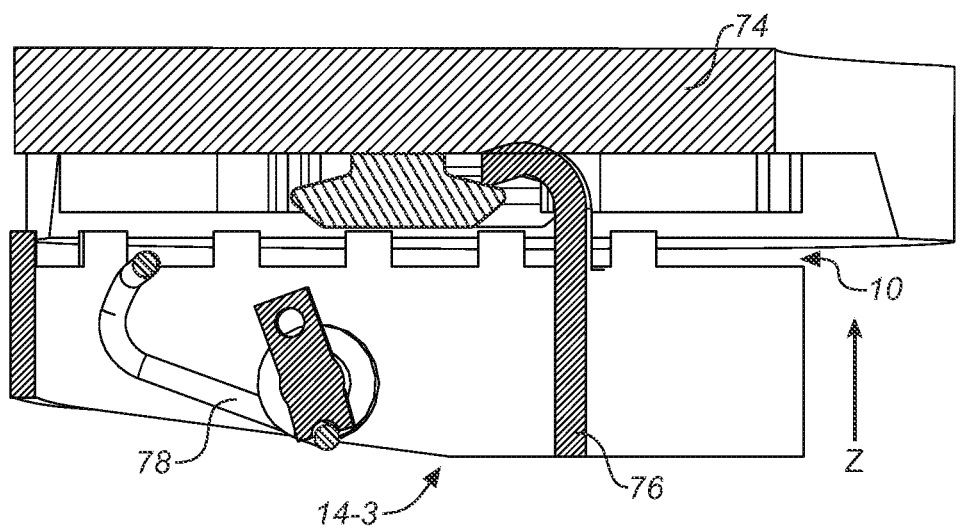
FIG. 7E is a detailed cross sectional view of an interface 10 in an unlatched state taken from section 7D-7D of FIG. 7C.

FIG. 7B is a bottom view and FIG. 7C is a side view of the sole 74, boot rail 72, and latch assembly 70. FIGS. 7D and 7E are cross section views of the locked and unlocked states respectively of interface 10 taken through section 7D-7D of FIG. 7C. Latch assembly 70 includes a combination of a fixed arm 76 and a rotating latch arm 78. FIG. 7D depicts a locked (latched) state of interface 10 in which boot rail 72 is captured between fixed arm 76 and rotating arm 78. FIG. 7E depicts an unlocked (unlatched) state of interface 10 in which the fixed arm 76 and rotating arm 78 are relatively separated from each other and the boot rail is free.

In operation, when a first input is received from rider 4, an actuator (part of restraining device 14-3) rotates arm 78 to capture boot rail 72 as in FIG. 7D. When a second input is received from rider 4, the actuator rotates arm 78 to release boot rail 72 as in FIG. 7E.

In an alternative embodiment both of latch features 76 and 78 are configured to rotate inwardly and outwardly. In response to a first input latch features 76 and 78 rotate together to converge upon and latch upon rail 72 as in FIG. 7D. In response to a second input latch features 76 and 78 separate from each other to release boot rail 72.

Figure 8A:
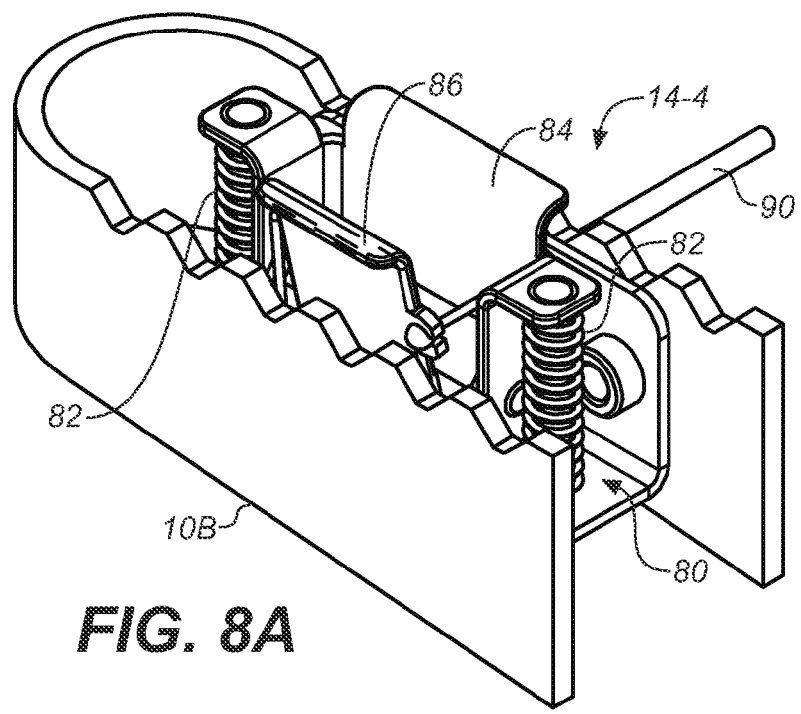
FIG. 8A is an isometric view depicting restraining device embodiment 14-4.
Figure 8B:
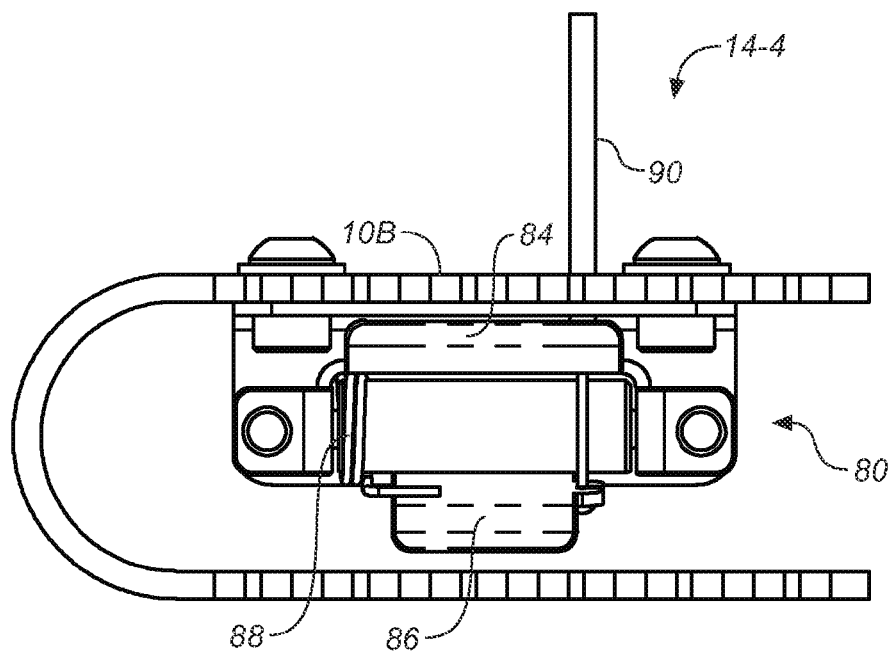
FIG. 8B is a top view of restraining device embodiment 14-4.

FIGS. 8A and 8B depict a fourth exemplary embodiment of restraining device 14-4 that includes a spring loaded latch assembly 80 configured to engage a channel (not shown, similar to channel 54 in FIG. 6A) formed into the sole of a boot. FIG. 8A is an isometric view and FIG. 8B is a top view of boot peg 10B having latch assembly 80 within.

Springs 82 urge or bias latch assembly 80 upwardly (toward the boot, not shown). Latch assembly 80 includes a fixed bracket 84 and a rotating latch bracket 86. Torsion spring 88 urges rotating latch bracket 86 toward an outward position that is away from fixed bracket 84. Actuation cable 90 is coupled to rotating latch bracket 86 such that pulling on actuation cable 90 with sufficient force rotates rotating latch bracket 86 toward fixed bracket 84.

Before activation of latch assembly 80 boot 10A (not shown) presses down against latch assembly 80. Because torsion spring 88 urges rotating latch bracket outwardly it cannot enter the boot channel (not shown). However, when actuation cable 90 is momentarily activated (first input from rider 4), torsion spring 88 is counteracted and rotating latch bracket 86 is rotated inwardly, allowing the fixed bracket 84 and the rotating latch bracket 86 to enter the boot channel (not shown). The release of the actuation cable 90 thereby locks latch assembly 80 to the boot 10A.

To unlatch the boot channel (not shown) the cable 90 is again pulled (second input from rider 4) to rotate the rotating latch bracket 86 toward fixed bracket 84. While the cable 90 is under tension, the rider 4 may release boot 10A from latch assembly 80.

Figure 9A:
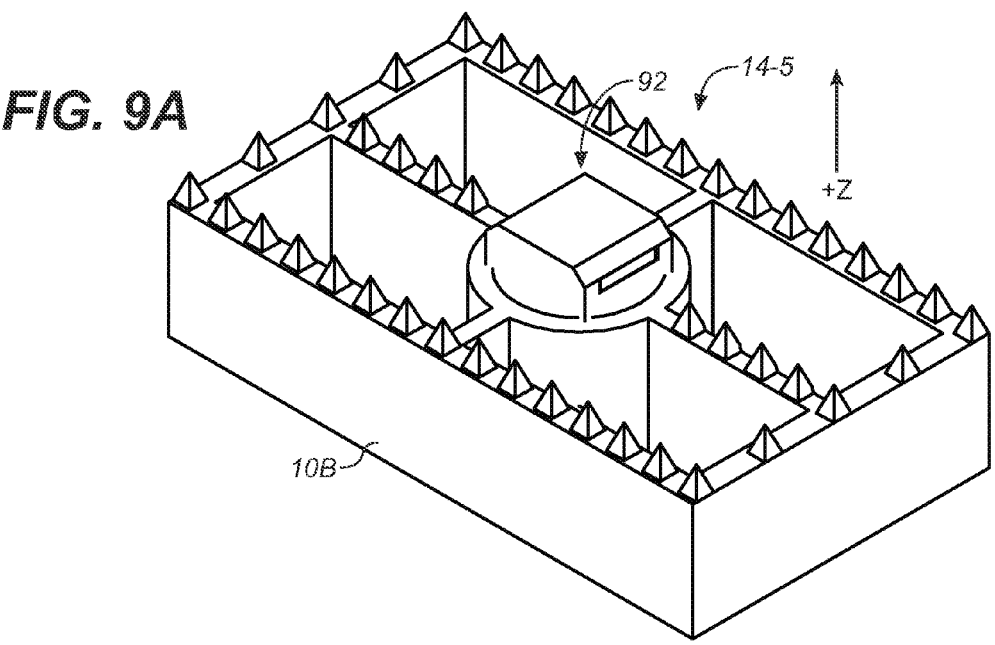
FIG. 9A is an isometric view depicting restraining device embodiment 14-5.
Figure 9B:
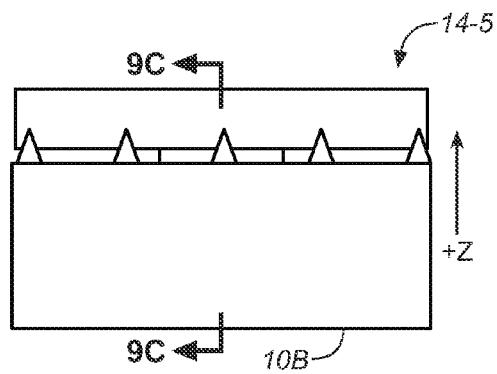
FIG. 9B is a side view of restraining device embodiment 14-5.
Figure 9C:
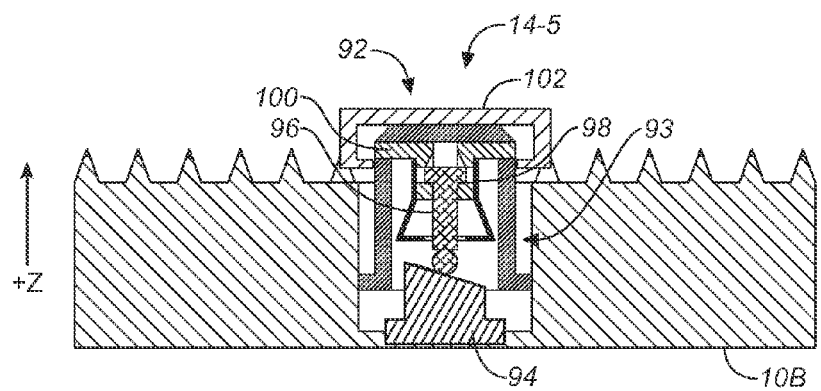
FIG. 9C is a cross sectional view 9C-9C taken from FIG. 9B.
Figure 10D:
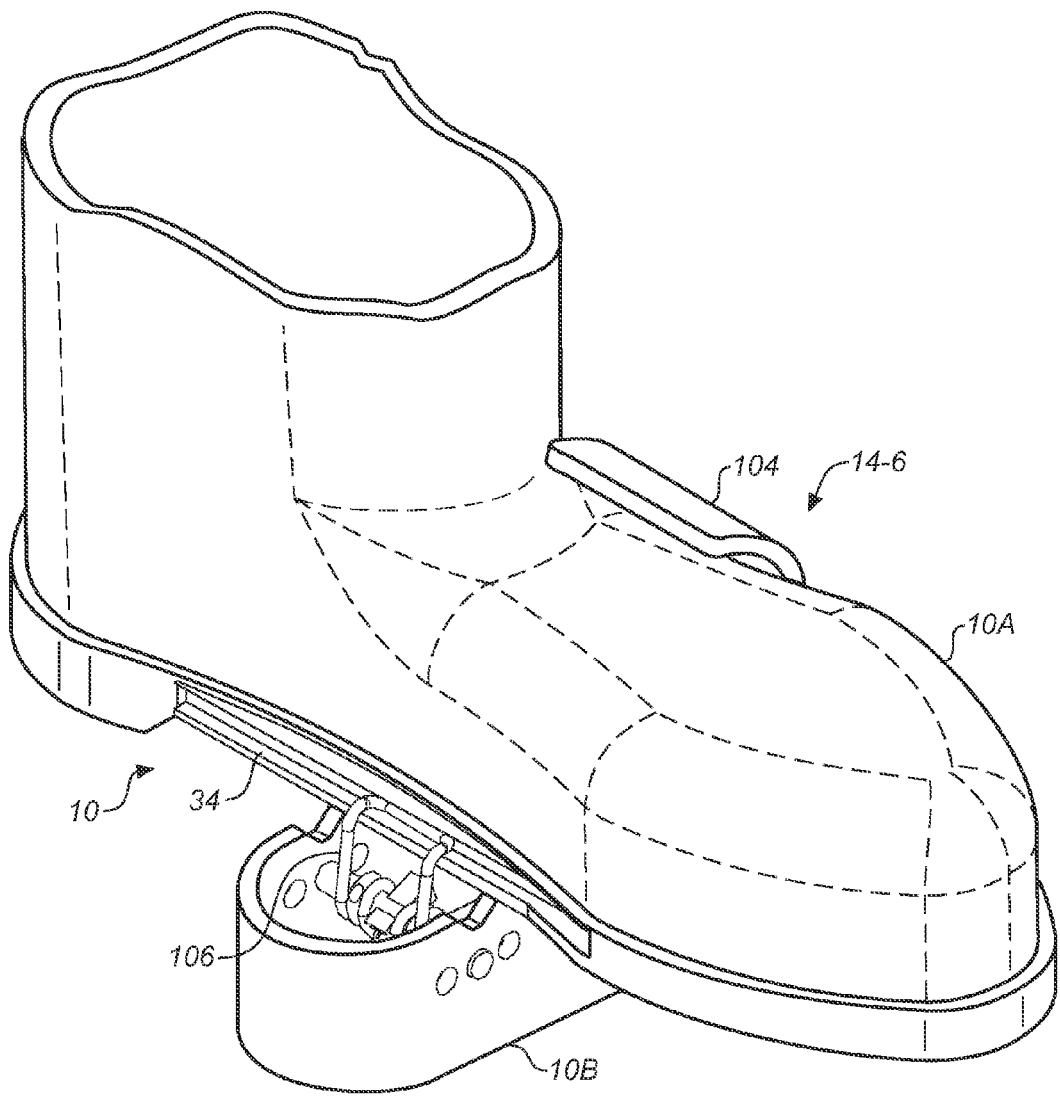
FIG. 10D is an isometric view of interface 10 including restraining device embodiment 14-6 with boot 10A in ghost.

FIGS. 9A-C depict a fifth embodiment of restraining device 14-5 that includes a telescoping latch assembly 92 integrated into peg 10B. Telescoping latch assembly 92 includes latch tower 93 and lift cam 94. Within latch tower 93 is drive pin 96, bias spring 98, and latch fingers 100.

Prior to activation of telescoping latch assembly 92, the tower is in a "down position" so as not to interfere with a boot 10A (not shown). Prior to activation the bias spring 98 biases latch fingers 100 inwardly together.

Upon activation of latch assembly 92 (first input from rider 4), lift cam 94 is rotated and thereby begins to raise latch tower 93 in an upward direction along the z axis. Latch fingers 100 are lifted along with latch tower 93 and enter boot channel 102. Latch fingers 100 are lifted until they reach an upper limit in boot channel 102. Cam 94 also pushes up drive pin 96, which continues to rise after the latch fingers 100 have reached the upper limit in boot channel 102. Pin 96 then forces fingers 100 apart so that they lock or latch into boot channel 102.

Upon a second input from rider 4, the cam rotates to allow pin 96 to drop along the z axis so that fingers 100 move back together. Then tower 93 retracts back down into peg 10B.

FIGS. 10A-D depict a sixth embodiment of restraining device 14-6 within interface 10. A boot 10A is secured to peg 10B utilizing an arcuate fixed inner extension 104 that cooperates with a rotating latch 106.

In use, boot 10A is placed under arcuate fixed inner extension 104 so that the arcuate extension 104 curves up and over a portion of boot 10A. Upon activation of restraining device 14-6 (first input from rider 4), the rotating latch 106 rotates over and captures a lip or top of boot sole 34 thus locking or latching boot 10A to peg 10B. Upon receiving a second input from rider 4, the rotating latch 106 rotates out of engagement from boot sole 34, releasing boot 10A.

Figure 11A:
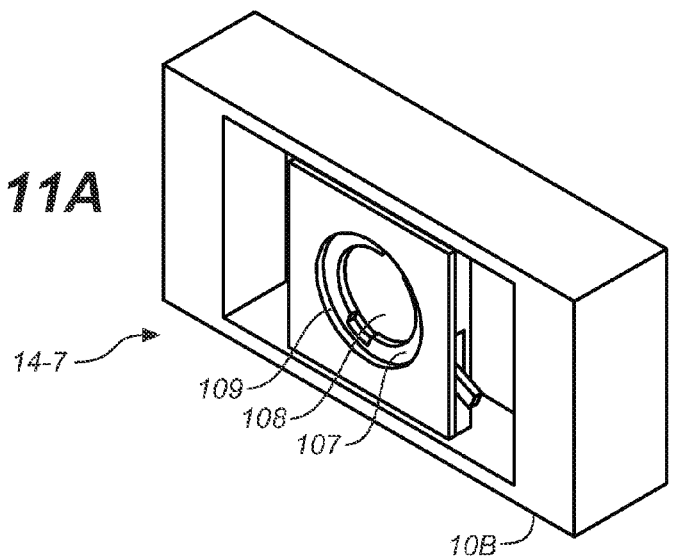
FIG. 11A is an isometric view of restraining device embodiment 14-7.
Figure 11B:
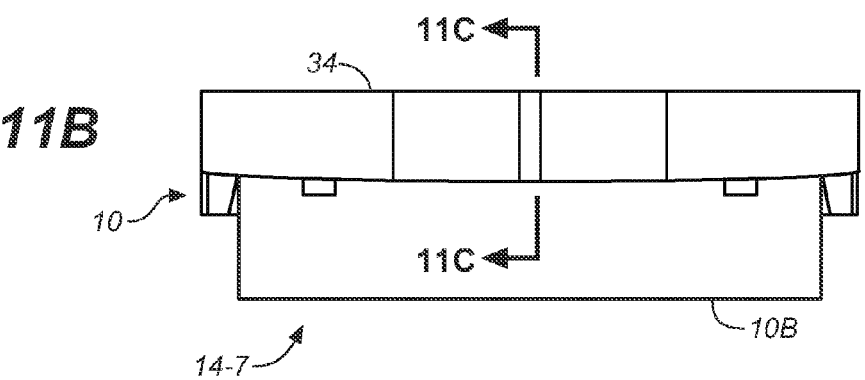
FIG. 11B is a side view of a restraining device embodiment 14-7.
Figure 11C:
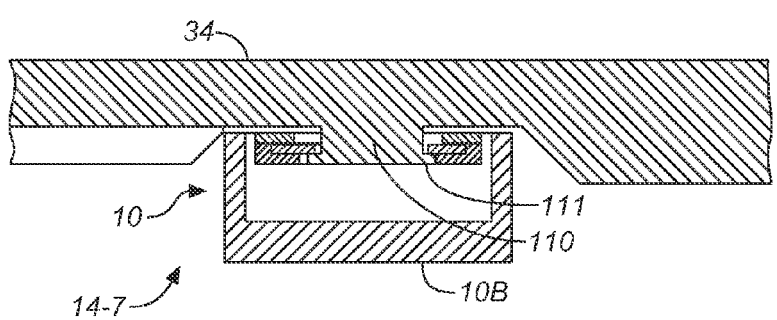
FIG. 11C is a cross sectional view 11C-11C taken from FIG. 11B.

FIGS. 11A-C depict a seventh embodiment of restraining device 14-7 within interface 10. FIG. 11 is an isometric view; FIG. 11B is a side view; FIG. 11C is cross section 11C-11C taken from FIG. 11B. Restraining device 14-7 includes a rotatable keyway plate 107 having an opening 108 that includes notches 109 in plate 107 that have a keying effect relative to a boot cleat 110. The boot cleat 110 has a complementary shape relative to opening 108 with two keys 111 that allow boot cleat 110 to be inserted into opening 108 when (and only when) the keys 111 are aligned with notches 109.

To activate device 14-7 the boot cleat 110 is passed into opening 108 while keys 111 are aligned with notches 109. Then, rotating keyway plate 107 is rotated so that notches 109 are no longer in alignment with keys 111. This locks boot sole 34 to peg 10B. To unlock boot sole 34, the keyway plate 107 is then rotated to align notches 109 with keys 111 so that boot cleat 110 may be lifted out of opening 108.

Figure 12A:
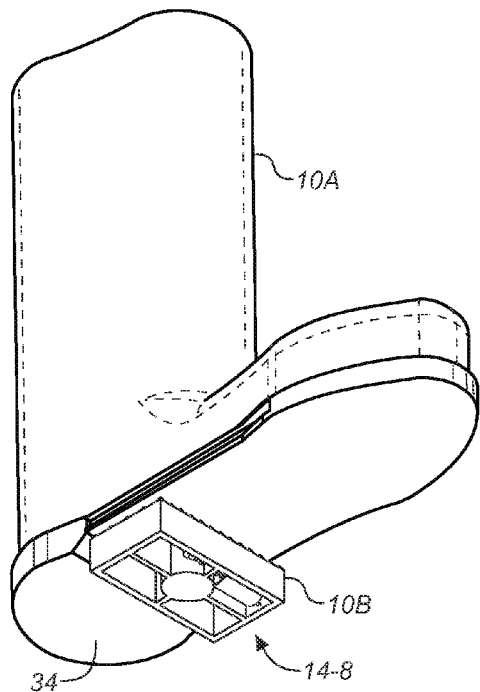
FIG. 12A is an isometric view looking up at boot 10A resting on peg 10B.
Figure 12B:
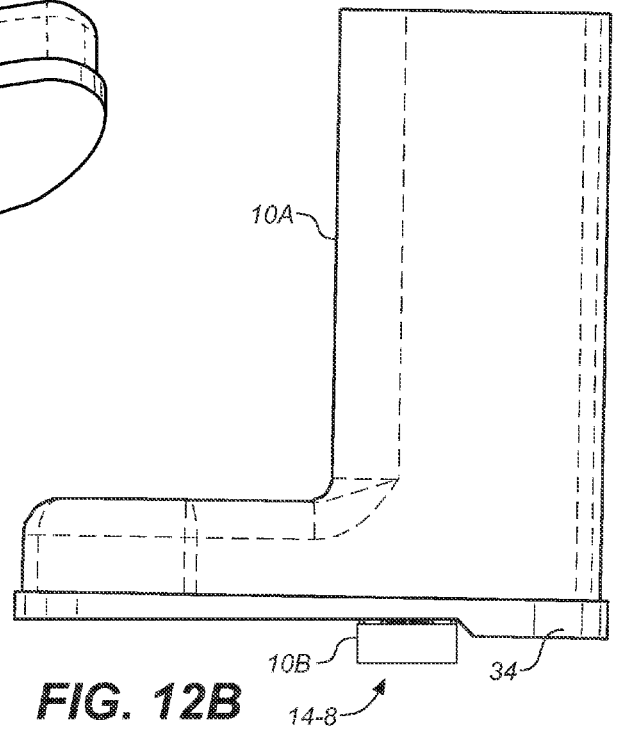
FIG. 12B is a side view of boot 10A resting on peg 10B.
Figure 12C:
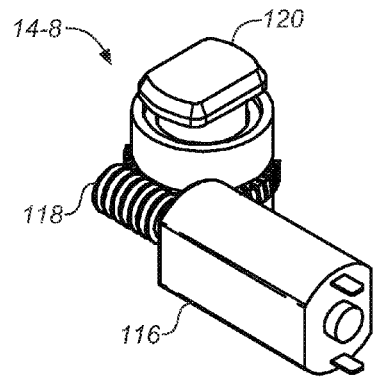
FIG. 12C is an isometric view restraining device embodiment 14-8.
Figure 12D:
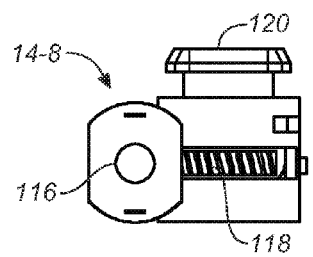
FIG. 12D is a side view of restraining device embodiment 14-8.

FIGS. 12A-D depict an eighth embodiment of restraining device 14-8 for restraining boot 10A to cleat 10B. FIG. 12A is an isometric looking up at peg 10B and boot 10A. FIG. 12B is a side view of boot 10A on peg 10B. FIG. 12C is an isometric view and FIG. 12D is a side view of restraining device embodiment 14-8 that is incorporated into boot peg 10B. A motor 116 is coupled to a worm gear 118 that in turn rotates a locking pin 120 that is similar to pin 52 discussed with respect to FIGS. 6A-F. Boot 10A has a channel (not shown) in sole 34 similar to channel 54 of FIGS. 6A, 6D, and 6F.

In use the boot sole 34 is placed upon peg 10B. In response to a first input from rider 4, restraining device 14-8 is activated whereby pin 120 is aligned with the channel (not shown) in sole 34 and then rotated by ninety degrees to lock pin 120 to the boot sole 34. In response to a second input from rider 4, the locking pin 120 is rotated by ninety degrees from the locked position to free the boot sole 34 from peg 10B. In an alternative embodiment the pin does not rotate a full ninety degrees from the unlocked to locked position but may rotate any angular amount in response to the first and second inputs to effectively lock and unlock sole 34 relative to peg 10B.

Figure 13A:
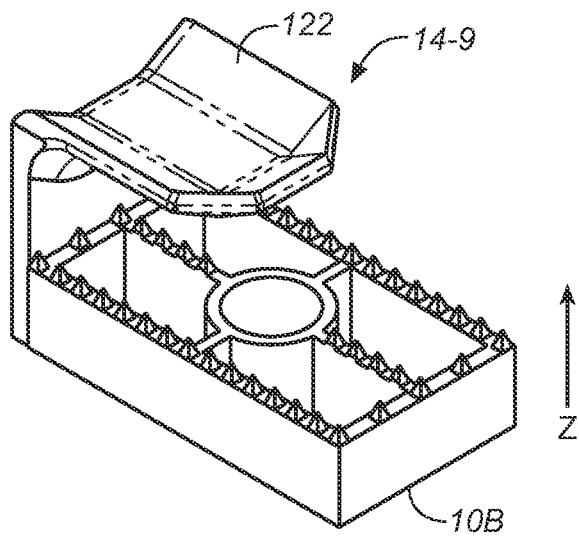
FIG. 13A is an isometric view of restraining device embodiment 14-9.
Figure 13B:
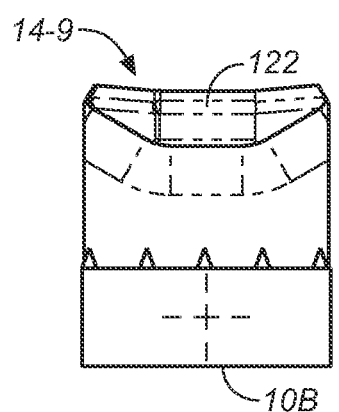
FIG. 13B is a frontal view of restraining device embodiment 14-9.
Figure 13C:
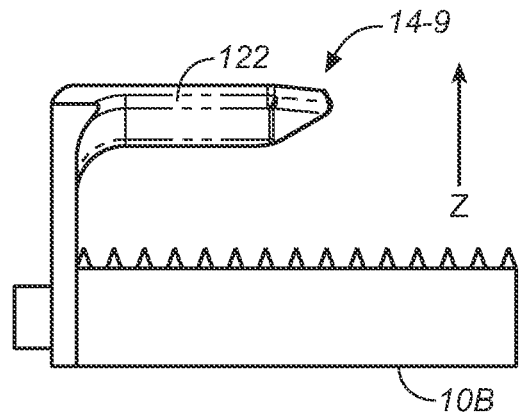
FIG. 13C is a side view of restraining device embodiment 14-9.

FIGS. 13A-C depict restraining device embodiment 14-9. FIG. 13A is an isometric view; FIG. 13B is an end view; FIG. 13C is a side view. Restraining device 14-9 includes a top portion 122 overhanging foot peg 10B so that a boot 10A (not shown) can be inserted between top portion 122 and foot peg 10B. Top portion 122 is restrained relative to foot peg 10B so as to provide the restraint to boot 10A relative to foot peg 10B along the Z-axis.

Figure 14A:
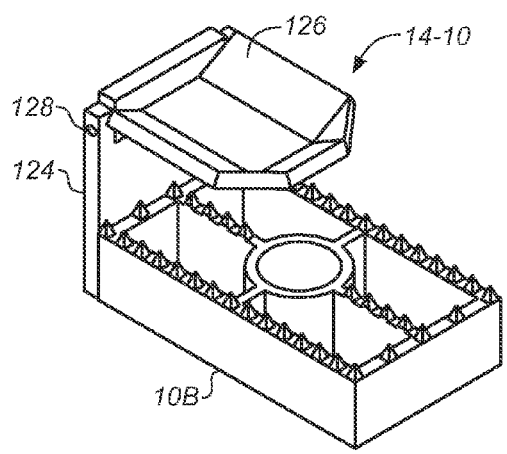
FIG. 14A is an isometric view of restraining device embodiment 14-10.
Figure 14B:
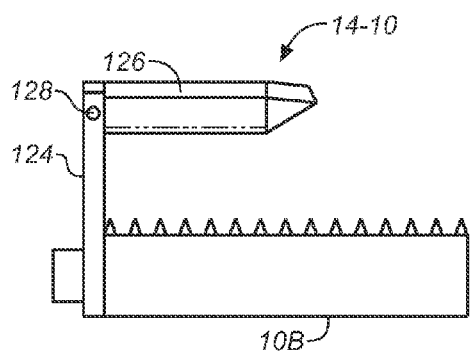
FIG. 14B is a side view of restraining device embodiment 14-10.
Figure 14C:
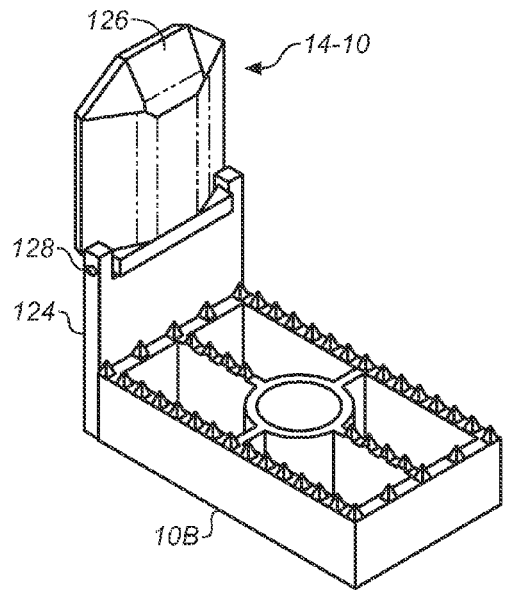
FIG. 14C is an isometric view of restraining device embodiment 14-10.
Figure 14D:
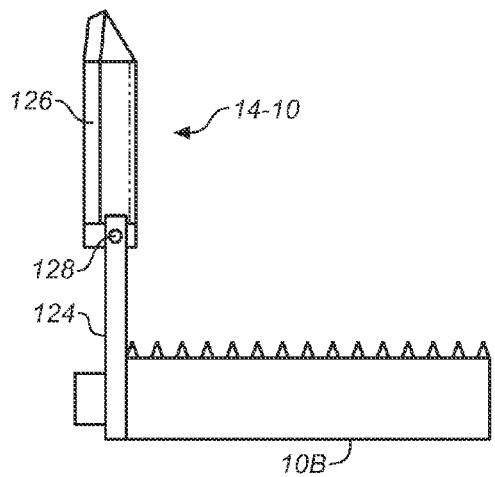
FIG. 14D is a side view of restraining device embodiment 14-10.

FIGS. 14A-D depicts a tenth embodiment of restraining device 14-10. FIG. 14A is an isometric view and FIG. 14B is a side view of restraining device 14-10 in a closed position over foot peg 10B. FIG. 14C is an isometric view and FIG. 14D is a side view of restraining device 14-10 in an open position relative to foot peg 10B.

Restraining device 14-10 includes vertical support member 124 that is fixedly coupled to foot peg 10B. A horizontal restraining portion 126 is rotatingly coupled to vertical support member 124 via hinge 128. Also coupled to horizontal restraining member 126 is an actuator (not shown) that is coupled to control interface 8.

The actuator (not shown) is configured to rotate horizontal restraining member from an open configuration (FIGS. 14C, D) to a closed configuration (FIGS. 14A, B) in response to a first input received by control interface 8 from rider 4. The actuator (not shown) is configured to rotate horizontal restraining portion 126 from the closed configuration (FIGS. 14A, B) to an open configuration (FIGS. 14C, D) in response to a second input received by control interface 8 from rider 4.

In use a rider 4 places his boot 10A (not shown) on foot peg 10B. Before activating device 14-10, the horizontal restraining portion 126 is in a vertical orientation as depicted in FIGS. 14C, D. When the rider provides a first input to control interface 8, an actuator (not shown) rotates horizontal restraining portion 126 from the vertical orientation to a horizontal orientation as depicted in FIGS. 14A, B. When the rider provides a second input to control interface 8, the actuator (not shown) rotates horizontal restraining portion 126 back to the vertical orientation as depicted in FIGS. 14C, D.

Other variations of this design are possible. For example, an electromagnet similar to the embodiment described with respect to FIGS. 5A-G may be used in combination with a pin embodiment similar to that described with respect to FIGS. 6A-E. The electromagnet may serve the purpose of helping to align a boot channel with a pin. Likewise, an electromagnet similar to the embodiment described with respect to FIGS. 5A-G may be used in combination with a latch embodiment similar to that described with respect to FIGS. 7A-E. The electromagnet in this case would help to align the boot rail with the latch. In yet another embodiment, a permanent magnet may be used in combination with either of the second (FIGS. 6A-E) or third (FIGS. 7A-E) embodiments to facilitate alignment between the restraining device 14 and the restraining feature 18.

While the invention has been described with respect to a limited number of embodiments, it will be appreciated that many variations, modifications and other applications of the invention may be made. The restraining system 6 of the present invention provides considerable advantages to the rider 4 of a motorcycle 2 over prior art systems. Rider 4 can quickly and easily restrain or disengage boot 10A to peg 10B using control interface 8. Over rough terrain or jumps the rider 4 now has much greater control over the motorcycle 2 when boot 10A is restrained to peg 10B. Moreover, the system 6 can be quickly disengaged to release boot 10A from peg 10B when rider 4 prefers to operate the motorcycle in a more conventional mode. When restraining system 6 is thus disengaged, the restraining device 14 is hardly noticeable to the rider 4.

The specific embodiments and applications thereof described above are for illustrative purposes only and do not preclude modifications and variations encompassed by the scope of the following claims.

We claim:

1. A system for restraining a rider's footwear to a foot support of a motorcycle having a handlebar comprising:
    a restraining device mounted on the foot support of the motorcycle; and
    a control interface mounted on the handlebar of the motorcycle coupled to the restraining device and configured to receive first inputs and second inputs from the rider, the restraining device configured to restrain the footwear in response to the first inputs and to release the footwear in response to the second inputs.

2. The system of claim 1 wherein the restraining device includes one of an electromagnet, a rotating lock, a linear latch, or a rotating latch.

3. The system of claim 1 further comprising footwear having a sole and a restraining feature coupled to the sole, the restraining device is configured to restrain or to release the restraining feature in response to the first and second inputs, respectively.

4. The system of claim 3 wherein the restraining feature includes one of a metal plate, a magnet, a magnetic plate, a non-metallic plate, an opening in the sole, an upstanding mechanical feature, or a cleat extending from the sole.

5. The system of claim 1 further comprising a coupling device that couples the restraining device to the control interface.

6. The system of claim 5 wherein the coupling device is one of a physical wire, a wireless signal link, a cable, a level, and a pressurized air path.

7. The system of claim 1 wherein the control interface is configured to receive the input from a wireless source.

8. A method of restraining a rider's foot to a motorcycle foot support comprising:
- providing a restraining device proximate to the motorcycle foot support;
- providing a control interface mounted on a handlebar of the motorcycle separate from but coupled to the restraining device;
- receiving a first input from the rider at the control interface;
- activating the restraining device to restrain the rider's foot to the foot support in response to the first input;
- receiving a second input from the rider at the control interface; and
- activating the restraining device to release the rider's foot from the foot support in response to the second input.

9. The method of claim 8 wherein receiving the first input or the second input is one of receiving a voice command, receiving a finger switch activation, receiving a hand lever activation, receiving a dial rotation, and receiving a wireless signal.

10. The method of claim 8 wherein activating the restraining device includes transmitting a signal from the control interface to the restraining device.

11. The method of claim 8 wherein activating the restraining device includes transmitting the input by one or more of mechanical transmission, pneumatic transmission, electrical transmission, or a wireless signal.

* * * * *

UNITED STATES PATENT AND TRADEMARK OFFICE
CERTIFICATE OF CORRECTION

PATENT NO.        : 9,038,502 B2
APPLICATION NO.   : 13/048722
DATED             : May 26, 2015
INVENTOR(S)       : Steven Zoumaras et al.

Page 1 of 1

It is certified that error appears in the above-identified patent and that said Letters Patent is hereby corrected as shown below:

Title page, line 1 of item (74), delete "Petit" and insert -- Pettit --

Signed and Sealed this
Twenty-ninth Day of March, 2016

Michelle K. Lee
*Director of the United States Patent and Trademark Office*